United States Patent [19]

Hoff et al.

[11] 4,035,561

[45] July 12, 1977

[54] METHOD OF POLYMERIZING

[75] Inventors: Raymond E. Hoff, Palatine; Mitsuzo Shida, Barrington, both of Ill.

[73] Assignee: Chemplex Company, Rolling Meadows, Ill.

[21] Appl. No.: 662,863

[22] Filed: Mar. 1, 1976

Related U.S. Application Data

[63] Continuation-in-part of Ser. No. 517,544, Oct. 24, 1974, Pat. No. 3,986,983.

[51] Int. Cl.² .................... C08F 4/02; C08F 10/02
[52] U.S. Cl. ............................. 526/130; 526/96; 526/106; 526/135; 526/154; 526/352
[58] Field of Search ............ 526/96, 100, 130, 135, 526/154, 106

[56] References Cited

U.S. PATENT DOCUMENTS

| | | | |
|---|---|---|---|
| 3,642,749 | 2/1972 | Johnson et al. | 526/130 |
| 3,687,910 | 8/1972 | Jones | 526/100 |
| 3,953,413 | 4/1976 | Hwang et al. | 526/96 |

*Primary Examiner*—Edward J. Smith
*Attorney, Agent, or Firm*—Wegner, Stellman, McCord, Wiles & Wood

[57] ABSTRACT

A method of polymerizing a monomer comprising ethylene in which a catalyst used is prepared by dispersing on a dry, finely divided, difficultly reducible inorganic oxide support such as silica a reaction product prepared by reacting pinacol with a chromium compound in which the reaction product is fixed to the support by heating at an elevated temperature in a non-oxidizing atmosphere.

6 Claims, No Drawings

4,035,561

METHOD OF POLYMERIZING

CROSS-REFERENCE TO RELATED APPLICATION

This is a continuation-in-part of our copending application Ser. No. 517,544, filed Oct. 24, 1974, now U.S. Pat. No. 3,986,983, issued Oct. 19, 1976, and claims methods of polymerizing with the catalyst claimed in this prior copending application.

BACKGROUND OF THE INVENTION

This invention relates to a method of polymerizing 1-olefins and especially ethylene by using a catalyst comprising the reaction product of pinacol and a chromium compound in which the reaction product is formed in situ fixed to the support by heating a mixture of support and reactants at an elevated reaction and activating temperature in a non-oxidizing atmosphere or in which the reaction product is first formed and then fixed to the support by the heating in a non-oxidizing atmosphere.

The use of chromium compounds as catalysts particularly in olefin polymerization is well known in the art, yet the pinacol-chromium reaction product catalysts of this invention are believed to be unique and previously unknown. The types of chromium catalysts known in the prior art are as follows.

One major class of chromium polymerization catalysts is represented by chromium oxide on silica or some other support. As described in U.S. Pat. No. 2,825,721, either chromium oxide or a compound which can be converted to chromium oxide by calcination is suitable for the preparaion of these catalysts. Activation by heating is required, and the atmosphere in contact with the catalyst during this heating preferably contains some oxygen, although it is stated that inert gases like nitrogen can be used. Whatever the activation conditions, a significant property of this type of catalyst is the hexavalent chromium content of the activated catalysts prior to the initial contact with hydrocarbons.

A second type of catalyst containing chromium belongs to the family of Ziegler catalysts. Such catalysts are disclosed in many patents, for example, U.S. Pat. No. 3,257,332, and they have been described in many publications, one of which is the article by J. K. Stille, Chemical Reviews, Vol. 58, pp. 541-579 (1958). A distinguishing feature of the Ziegler group of catalysts is the requirement that there be used along with the transition metal compound a reactive cocatalyst. The cocatalyst is an organometallic compound such as aluminum alkyl compound, a reactive metal, or metal hydride.

The catalysts used in the methods of this invention are clearly distinct from these two major types of chromium catalysts. No reactive organometallic cocatalyst or similar reagent is needed for the catalysts we have discovered. This feature makes the catalysts of this invention different from those of the Ziegler group. Furthermore, in our fixation process evidence indicates that any hexavalent chromium (an essential of U.S. Pat. No. 2,825,721) if initially present is destroyed.

DESCRIPTION OF THE PREFERRED EMBODIMENT

In the catalysts used in the methods of this invention the pinacol is reacted with the chromium compound which is preferably either chromium tetra-tertiary-butoxide, di-tertiary-butyl chromate, or ammonium chromate. This reaction product is simultaneously fixed to the support and the resulting catalyst activated by heating the mixture at an elevated temperature in a non-oxidizing atmosphere. Preferably the reaction product is present in an amount of about 0.001–10% by weight. The reaction product may either be first prepared and then dispersed on and fixed to the support or the reaction ingredients and support may be mixed together and heated so that there is a simultaneous formation of the reaction product and fixing on the support with simultaneous activating.

The inorganic oxide support may be either silica, titania, alumina, thoria, zirconia or mixtures thereof. Preferably the pinacol and chromium compound reactants are in a molar ratio of from 2–4 inclusive to 1, that is, there will be a molar ratio of 2 to 4 parts by weight of the pinacol to each part of the chromium compound. The reaction and activating and fixing temperaure may be over a range whose maximum is about 400°–1100° C.

The olefins which are polymerized with the catalyst of this invention are preferably 1-olefins of 2–8 carbon atoms or a copolymerizable mixture of one of these with $C_2$–$C_{20}$ olefins.

The inorganic oxide support may be prepared by coprecipitation, impregnation, vapor phase deposition, etc. Surface area of the support may range from a few $m^2/g$ to over 700 $m^2/g$ but preferably not above 150 $m^2/g$. Pore volume is preferably in excess of 0.5 cc/g if surface area is primarily related to micropores. A finely divided non-porous support with relatively high surface area such as "Cab-O-Sil" may also be used with this invention. Activation and calcining of the catalyst at elevated temperatures of preferably about 250°–1100° C. is accomplished either in a fluid bed maintained by the flow of non-oxidizing gas or in a stationary bed under high vacuum, provided optionally with a small leak-in of non-oxidizing gas.

The support comprising the inorganic oxide may be pretreated so as to adjust the moisture content of the support. This pretreatment may be carried out in a fluidized bed with any dry non-reactive gas such as air or nitrogen. Alternately, the pretreatment may be carried out in a stationary bed such as in a muffle furnace. Pretreatment in the fluidized bed is preferable to the calcination in the muffle furnace, especially if temperatures are above 425° C. The optimum pretreatment temperture is dependent on the support type and its physical properties and may range from 200° C. to 1100° C.

The dispersion of the pinacol-chromium compound reaction product or the dispersion of the reactants themselves on the support where the reaction product is formed in situ can be readily accomplished by a conventional impregnation method using organic solvents such as hexane, tolulene or benzene. Equally satisfactory dispersion is often achieved by a more convenient method which calls for dry-blending of the reaction product or reactants with the support and effecting the final dispersion during the initial stage of activation. If such a dry-blending technique is used, the subsequent activation is best carried out in the fluid bed operation. In this invention the support can have a surface area of 100–800 $m^2/g$ or greater and pore volume of 0–3.0 cc/g.

The catalyst used in this invention is activated in a non-oxidizing atmosphere which may be either an inert atmosphere such as nitrogen or a mixture of such an inert gas in carbon monoxide. In any event the atmosphere is non-oxidizing. The non-oxidizing atmosphere is provided either by inert gas such as nitrogen, helium, argon, etc., by a reducing agent such as carbon monoxide, hydrogen, etc. or by evacuation to a sufficiently high vacuum. In the latter case, it is desirable to permit deliberate leak-in of a small amount of non-oxidizing gas. In all cases, a mixture of non-oxidizing gases may be used, if desired.

When the activation is carried out under non-oxidizing (inert or reducing) gas atmosphere, either fluid-bed or stationary-bed operations may be used. Our experience, however, shows that fluid-bed operation is preferable. Normally, for economic reasons, flowing nitrogen is used to fluidize the catalyst in an activator. The temperature is raised to the final activation temperature according to a preselected cycle which normally calls for a 1 to 3 hour hold at 150°–180° C. and again at 290°–315° C. The final activation temperature may range from about 400°–1100° C.

The catalysts may be used in liquid-phase, solution or slurry processes or vapor-phase processes. In the liquid-phase operation any $C_3$–$C_{12}$ saturated hydrocarbon may be used as a reaction medium or diluent. Other types of solvents including aromatic hydrocarbons and chlorinated solvents may also be used. The polymerization of the 1-olefins may be carried out in batch or continuous process. The catalyst is generally charged into the reactor as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

The olefin polymer or copolymer is normally recovered by flashing off the solvent or diluent without any intervening steps for removal of the catalyst. The activity of the novel catalysts used in this invention can be high enough so that catalyst removal steps can be omitted for all practical purposes. In the case of ethylene, pressures may range from atmospheric to 30,000 psig and temperatures from 65° C. to 260° C.

The following examples illustrate the invention:

EXAMPLE 1

(Control, without pinacol)

A 4.0 gram quantity of Davison grade 952 silica was placed in a quartz tube having a fritted disc. Pure nitrogen was passed upward through the fritted disc to cause the silica to fluidize while it was heated to 540° C. for a period of 5 hours. The silica was then cooled to 100° C. and a solution of chromium tetra-tertiary-butoxide in benzene was added so that the amount of chromium upon the silica was 1% by weight. Addition of the benzene caused further cooling, but the combination was heated to 550° C. for 40 minutes. The flow of pure nitrogen was maintained throughout this heating. The cooled silica containing the chromium was kept under $N_2$. A quantity of this material in the amount of 2.0689 grams was transferred to a steel autoclave which was dry and being purged with polymerization grade ethylene. The temperature of the autoclave was 100° C. 500 milliliters of isobutane was forced into the pressure vessel and the total pressure made to 550 psig with ethylene. The contents of the vessel were stirred and constant temperature and pressure were maintained for 1 hour. At the end of this period, there was no polyethylene formed and, upon evaporation of the isobutane, only the chromium-containing silica remained.

EXAMPLE 2

1 gram of pinacol was dissolved in 11 ml of a hexane solution of chromium tetra-tertiary-butoxide so that the pinacol to chromium compound molar ratio was 2 to 1. The hexane was gently evaporated under a nitrogen flow and 50 ml of dry benzene was added to replace the hexane. The solution was then refluxed for one hour with a trap on the condenser line. The solution was cooled to room temperature and purged with nitrogen overnight. Another 50 ml of benzene was added. A 10 ml portion of the solution was added to 4 grams of Davison 952 silica which had been dried under nitrogen fluidization as described in Example 1. The temperature of the silica was kept at 85°–100° C. for 20 minutes, then was increased to 290° C., and finally 700° C. for 2 minutes, then rapidly cooled. This material was tested for ethylene polymerization reactivity in exactly the same manner as described in Example 1. The amount used was 0.6022 gram and the yield of high density polyethylene in one hour was 54 grams. A portion of the chromium compound-pinacol solution was analyzed iodometrically from which value the catalyst had a reactivity of 12,900 g/g Cr/hr.

EXAMPLE 3

A second catalyst was prepared from the same pinacol-chromium solution of Example 2. A 4.0 grams quantity of Davison 952 silica was dried under nitrogen fluidization as in Example 1 at 540° C. for 5 hours. A 10 ml portion of the pinacol-chromium compound solution was syringed onto the fluidizing silica at 75° C. After 10 minutes, the temperature was increased to 540° C. in 1 hour 10 minutes and then held at 540° C. for 40 minutes. It was increased to 700° C. for 20 minutes, and then the catalyst was cooled to 100° C. The flow of nitrogen was maintained at all times. A polymerization test was done in the manner of Example 1 with 0.7944 gram, and the chromium reactivity was found to be 24,500 g/g Cr/hr.

EXAMPLE 4

4 grams of Davison grade 952 silica was dried by heating in nitrogen to 650° C. and cooled. The heating time was 20 minutes. A pinacol in benzene solution was deposited upon the silica. The ampunt of pinacol added was 0.259 gram. A hexane solution of chromium tetra-tertiary-butoxide was added to make the pinacol-chromium molar ratio equal to 3 to 1. The temperature was then raised to 775° C. maintaining the flow of pure nitrogen throughout. A polymerization test of this catalyst with ethylene as in Example 1 resulted in a chromium reactivity of 11,000 g/g Cr/hr.

EXAMPLE 5

A catalyst was prepared as in Example 4 except that the fixation temperature was 900° C. Its reactivity was found to be 17,600 g/g Cr/hr.

EXAMPLE 6

A series of four catalysts was prepared using ammonium chromate as the chromium compound. Ammonium chromate was dissolved in deionized water and the solution added to each preparation so as to give 0.8% chromium. These four catalysts, A, B, C and D, were made as follows.

Catalyst A 0.185 gram of ammonium chromate was dissolved in 8 ml water and mixed with 8 grams of Davison 952 silica to give a uniform color. Then another 8 ml of water was mixed in. The damp silica containing the ammonium chromate was put into a quartz tube equipped with a fritted disc. Pure nitrogen was passed upward through the fritted disc at a rate of 400 cc/minute. After the water had evaporated, 16 ml of benzene was added to the fluidized bed of catalyst. Heating was then continued to 810° C. which was held for 280 minutes. The catalyst was cooled to 125° C. while maintaining the nitrogen fluidization. It was then transferred to a storage vessel under nitrogen atmosphere.

Catalyst B

This catalyst was prepared in the same way as Catalyst A except that 0.282 gram of pinacol was dissolved in the 16 ml of benzene so that the molar ratio of pinacol to chromium compound was 1.96 to 1.

Catalyst C

Catalyst C was made in the same way as catalyst B.

Catalyst D 16 grams of the Davison 952 silica was blended with 0.375 gram of ammonium chromate dissolved into enough water to mix thouroughly and obtain a uniform color. To the damp silica, 1.16 grams of pinacol was added and the combination was mixed so that the pinacol was dispersed. The pinacol to chromium compound molar ratio was 4.0 to 1. The catalyst was heated with upward flowing nitrogen as in the case of Catalyst A. It was first heated at 100° C. for 50 minutes to evaporate most of the water, and then the temperature was increased to 200° C. in 10 minutes. A portion of the catalyst was reomved for analysis, and the remainder was heated while being fluidized by pure nitrogen at a flow rate of 300 cc/min. The temperature was held at 690° C. for 6 hours, and then the catalyst was cooled to 110° C. and transferred to a storage vessel under nitrogen.

Each catalyst was tested for ethylene polymerization at 550 psig total pressure. In addition, a sample of each catalyst was carefully transferred to a quantity of oxygen-free water. The resulting solutions of extracted chromium were titrated by a standard iodometric method commolly used for the determination of oxidizing agents such as hexavalent chromium. The samples of catalysts A, B and C were titrated after the full heating cycle. The sample of catalyst D for analysis was taken at an intermediate point in the heating cycle. Table 1 shows that small amounts of residual oxidative capacity in the catalyst bear no clear relation to catalyst reactivity. Furthermore, the use of the pinacol has eliminated the induction period observed with the ammonium chromate catalyst made without pinacol. Reactivities are calculated as grams of polymer/gram of chromium/hour.

TABLE 1

| Catalyst | Induction Period Mins. | Pinacol Chromium Compound Molar Ratio | Oxidative Capacity Milliequivalents /gram | Reactivity |
|---|---|---|---|---|
| A | 24 | 0 | Not detectable | 11,000 |
| B | 0 | 1.96 | 0.084 | 24,200 |
| C | 0 | 1.96 | Trace detected | 23,500 |

TABLE 1-continued

| Catalyst | Induction Period Mins. | Pinacol Chromium Compound Molar Ratio | Oxidative Capacity Milliequivalents /gram | Reactivity |
|---|---|---|---|---|
| D | 0 | 4.0 | 0.005 | 37,000 |

EXAMPLE 7

A mixture of 0.958 gram of pinacol hexahydrate and 8 grams of Davison 952 silica was prepared, and 0.134 gram of ammonium dichromate dissolved in 8 ml of water was added. The molar ratio of pinacol to chromium compound was 8 to 1, however, the ratio of pinacol to hexavalent chromium was 4 to 1. The chromium content of the catalyst was 0.7 weight percent, calculated as one hundred times the chromium weight divided by the silica weight. The mixture prepared in this way was heated under nitrogen fluidization to 175° C. After 10 minutes a quantity of pure carbon monoxide was mixed with the nitrogen, the flow rates being set at 560 cc/min for nitrogen and 40 cc/min for carbon monoxide. Maintaining these flow rates, the catalyst bed temperature was increased to 700° C. over 5 hours, and then this maximum temperature was held for 5 hours and 40 minutes. Afterwards, the catalyst was cooled to 230° C., the carbon monoxide flow was stopped, and the nitrogen flow maintained for an additional hour. A polymerization test was conducted at 102° C. and 550 psig total pressure, using 500 ml of isobutane as a solvent for the ethylene. Similar catalysts were made using ammonium chromate and pinacol, producing a series of catalysts of differing chromium contents. Table 2 shows that the reactivity is not sensitive to the amount of chromium upon the carrier within the range tested.

TABLE 2

| Chromium Level | Total Catalyst Reactivity | Chromium Reactivity |
|---|---|---|
| 0.4 | 300 | 75,000 |
| 0.6 | 422 | 70,000 |
| 0.7 | 590 | 84,000 |
| 0.8 | 600 | 75,000 |
| 1.0 | 730 | 73,000 |

EXAMPLE 8

A catalyst was prepared as described in Example 7 except the support was a microspheriodal titania, anhydrous pinacol was used, and the pinacol to ammonium chromate molar ratio was 2 to 1. This catalyst had a chromium reactivity of 1100.

Davison grade 952 silica has a pore volume of 1.6 cc/g.

All parts and percentages herein are by weight.

Having described our invention as related to the embodiments set out herein, it is our intention that the invention be not limited by any of the details of description, unless otherwise specified, but rather be constructed broadly within its spirit and scope as set out in the appended claims.

We claim:

1. The method of polymerizing a monomer charge comprising 1-olefins of 2–8 carbon atoms or a copolymerizable mixture of one of these with $C_2$–$C_{20}$ olefins which comprises contacting said charge under polymerizing conditions with a catalyst prepared by dispersing on a dry, finely divided, difficultly reducible, inorganic oxide support a reaction product prepared by reacting pinacol with a chromium compound in a molar ratio of 2-4 pinacol to 1 chromium compound, said chromium compound being of the class consisting of chromium tetra-tertiary-butoxide, ditertiary-butyl chromate, ammonium chromate and ammonium dichromate, the reaction product being fixed to said support and the resulting catalyst activated by heating to a final activation temperature of about 400°–1100° C. in a nonoxidizing atmosphere, said reaction product being present in an amount of about 0.001–10 wt.% and said support being present in an amount of about 99.999–90 wt.%.

2. The method of claim 1 wherein said olefin comprises ethylene.

3. The method of claim 1 wherein said reaction product of pinacol and the chromium compound is first prepared and then dispersed on said inorganic support.

4. The method of claim 1 wherein said support is a member of the class consisting of silica, titania, alumina, thoria, zirconia and mixtures thereof.

5. The method of claim 1 wherein said reaction product is prepared by adding the pinacol and said chromium compound to said support and then reacting by heating the materials to a reaction temperature.

6. The method of claim 1 wherein said inorganic support comprises finely divided silica.

* * * * *